(12) United States Patent
Chivite Zabalza et al.

(10) Patent No.: US 12,494,708 B2
(45) Date of Patent: Dec. 9, 2025

(54) CIRCUITRY AND METHOD FOR TRANSITIONING BETWEEN MODES OF OPERATION DURING AN ELECTRICAL FAULT

(71) Applicant: ROLLS-ROYCE plc, London (GB)

(72) Inventors: Francisco Javier Chivite Zabalza, Stafford (GB); David R Trainer, Derby (GB); Mark Sweet, Chesterfield (GB); Matthew C Morris, Glasgow (GB); Zafer Jarrah, Bristol (GB)

(73) Assignee: ROLLS-ROYCE plc, London (GB)

( * ) Notice: Subject to any disclaimer, the term of this patent is extended or adjusted under 35 U.S.C. 154(b) by 258 days.

(21) Appl. No.: 18/323,878

(22) Filed: May 25, 2023

(65) Prior Publication Data

US 2023/0421054 A1 Dec. 28, 2023

(30) Foreign Application Priority Data

Jun. 23, 2022 (GB) ..................................... 2209220

(51) Int. Cl.
*H02M 1/32* (2007.01)
*H02M 1/00* (2007.01)
*H02M 7/219* (2006.01)

(52) U.S. Cl.
CPC ........... *H02M 1/325* (2021.05); *H02M 7/219* (2013.01); *H02M 7/2195* (2021.05); *H02M 1/0054* (2021.05)

(58) Field of Classification Search
CPC .... H02M 7/217; H02M 7/219; H02M 7/2195; H02M 1/325; H02H 7/125; H02H 7/1255; H02H 7/1257; H02H 9/02
See application file for complete search history.

(56) References Cited

U.S. PATENT DOCUMENTS 9,188,620 B1 11/2015 Wagner
9,712,055 B1 7/2017 Swartz et al.
(Continued)

FOREIGN PATENT DOCUMENTS

CN 112260572 A 1/2021
DE 10 2019 207 968 A1 12/2020
(Continued)

OTHER PUBLICATIONS

Oct. 26, 2023 Search Report issued in European Patent Application No. 23174709.8.
(Continued)

*Primary Examiner* — Gustavo A Rosario-Benitez
(74) *Attorney, Agent, or Firm* — Oliff PLC

(57) ABSTRACT

A power conversion circuitry configured to transition between modes of operation during an electrical fault, including: switching circuitry configured to control currents flowing along a plurality of current paths between respective pairs of nodes, wherein the paths include first and second transistor-diode pairs; and control circuitry connected to the switching circuitry configured to: configure the switching circuitry to transition, when an electrical fault is detected, to a first mode of operation by configuring the transistors to switch to a non-conducting state so currents flow through the diodes, determine when current begins to flow through a diode, and configure the switching circuitry to transition from the first mode to a fault mode of operation by configuring the transistors to sequentially switch to a conducting state so currents flow through the configured transistors. Also, a method of controlling power conversion circuitry to transition between modes of operation during an electrical fault.

19 Claims, 6 Drawing Sheets

(56) References Cited

U.S. PATENT DOCUMENTS

| | | |
|---|---|---|
| 9,800,129 B2 | 10/2017 | Ortiz |
| 9,831,798 B2 | 11/2017 | Toujinbara |
| 2004/0240240 A1 | 12/2004 | Bijlenga et al. |
| 2011/0234130 A1* | 9/2011 | Okumura ............... G01R 31/52 |
| | | 318/400.07 |
| 2012/0182771 A1* | 7/2012 | Trainer ................. H02J 3/1857 |
| | | 363/51 |
| 2013/0208514 A1* | 8/2013 | Trainer ............... H02M 1/4208 |
| | | 363/35 |
| 2016/0365787 A1* | 12/2016 | Geske ..................... H02M 1/32 |
| 2017/0276715 A1* | 9/2017 | Heinz .................... G01R 31/52 |
| 2017/0310237 A1* | 10/2017 | Uda ..................... H02H 7/1257 |
| 2018/0076734 A1* | 3/2018 | Jimichi ................. H02M 7/003 |
| 2019/0131867 A1* | 5/2019 | Ishii ........................ H02M 1/32 |
| 2020/0067303 A1 | 2/2020 | Uchida et al. |
| 2020/0136370 A1* | 4/2020 | Loder ....................... H02J 3/36 |
| 2020/0412235 A1* | 12/2020 | Chivite-Zabalza ......................... |
| | | H02M 7/4837 |
| 2022/0181992 A1* | 6/2022 | Toshiyuki ............. H02M 1/325 |
| 2022/0190591 A1 | 6/2022 | Wang et al. |

FOREIGN PATENT DOCUMENTS

| | | |
|---|---|---|
| EP | 3 258 563 A1 | 12/2017 |
| EP | 3 920 393 A1 | 12/2021 |
| JP | 107-298481 A | 11/1995 |
| WO | 2008/139283 A2 | 11/2008 |

OTHER PUBLICATIONS

Oct. 24, 2023 Search Report issued in European Patent Application No. 23174708.0.

Nov. 29, 2022 Search Report issued in British Patent Application No. GB2209219.1.

Nov. 8, 2022 Search Report issued in British Patent Application No. GB2209220.9.

U.S. Appl. No. 18/323,884, filed May 25, 2023 in the name of Chivite Zabalza et al.

Jun. 12, 2025 Notice of Allowance issued in U.S. Appl. No. 18/323,884.

* cited by examiner

CIRCUITRY AND METHOD FOR TRANSITIONING BETWEEN MODES OF OPERATION DURING AN ELECTRICAL FAULT

BACKGROUND

This specification is based upon and claims the benefit of priority from UK Patent Application Number 2209220.9 filed on 23 Jun. 2022, the entire contents of which are incorporated herein by reference.

FIELD OF THE DISCLOSURE

The present disclosure relates to circuitry and methods for transitioning between modes of operation during an electrical fault.

BACKGROUND OF THE DISCLOSURE

Existing circuitry is configured to instantaneously switch to an alternative mode of operation upon detecting the presence of an electrical fault by switching every transistor within a circuit at the same time.

It will be understood that improvements in techniques for responding to detection of an electrical fault are desirable.

SUMMARY

According to a first aspect there is provided power conversion circuitry configured to transition between modes of operation during an electrical fault, the power conversion circuitry comprising: switching circuitry configured to control currents flowing along a plurality of current paths between respective pairs of nodes of the power conversion circuitry, wherein the plurality of current paths each comprise first and second transistor-diode pairs connected along the respective current path; and control circuitry connected to the switching circuitry, the control circuitry configured to: configure the switching circuitry to transition, when an electrical fault is detected, to a first mode of operation by configuring transistors of the transistor-diode pairs to switch to a non-conducting state such that currents flow along the respective current paths through diodes of the transistor-diode pairs during the first mode of operation, determine, for each current path, when current begins to flow through a given diode of a given transistor-diode pair during the first mode of operation, and configure the switching circuitry to transition from the first mode of operation to a fault mode of operation by configuring transistors of the given transistor-diode pairs to sequentially switch to a conducting state when current begins to flow through the given diodes such that currents flow along the respective current paths through the configured transistors during the fault mode of operation.

The fault mode of operation may be a second mode of operation or a third mode of operation. The second mode of operation may be a mode in which the switching circuitry is configured for active rectification (i.e. synchronous rectification). The third mode of operation may be a mode in which the switching circuitry is may be a mode in which the switching circuitry is configured for crowbar operation.

Active/synchronous rectification during the second mode of operation may comprise switching certain transistors on and off to rectify AC.

Crowbar operation during the third mode of operation may comprise turning certain groups of transistors on while turning other groups of transistors off to prevent current flowing to an output node. In such an arrangement, the transistors may be configured to conduct current in both directions (i.e. bidirectional transistors) such that currents flow between the current paths without flowing to the output node.

The first, second and third modes of operation may be consecutive or non-consecutive modes of operation.

The switching circuitry may transition from the first mode of operation to the second mode of operation without subsequently transitioning to the third mode of operation. The switching circuitry may transition from the first mode of operation to the second mode of operation and then to the third mode of operation.

The switching circuitry may transition from the first mode of operation directly to the third mode of operation without entering the second mode of operation.

Transitioning between modes of operation during an electrical fault (e.g. a DC fault) by applying sequenced switching of transistors, based on when current begins flowing in antiparallel diodes, ensures transistor switching occurs at a low voltage (i.e. the diode voltage drops), which thereby protects the transistors from damage during switching.

Sequential switching of the transistors based on antiparallel diode conduction minimises switching losses, reduces electromagnetic interference and increases the reliable operation of the transistors in a fault situation.

With sequential switching of the transistors, the transition between modes of operation is achieved quickly (e.g. within one power frequency cycle).

A mode of operation may be a configuration of the power conversion circuitry which controls the currents to flow along the current paths in a particular manner. Different modes may configure the power conversion circuitry is different arrangements such that currents are controlled to flow along the current paths in different directions and/or flow along different combinations of current paths.

The first mode of operation may be referred to as a blocked mode or a passive rectification mode (i.e. passive rectification of an alternating current (AC) at the first node to direct current (DC) at the second node using conducting diodes only).

An electrical fault may be any electrical fault resulting in overcurrent and or overvoltage. For example, the electrical fault may be a short circuit at the output of the power conversion circuitry, or a short circuit of the power conversion circuitry itself, such as a shoot through fault within the switching circuitry.

The transistors of the transistor-diode pairs may be configured to switch on and off according to a predetermined switching pattern. Where the switching circuitry comprises plural transistors, those transistors may be configured to switch on and off at different times according to the predetermined switching pattern.

The transistors may be field effect transistors (FETs) or bipolar junction transistors (BJTs). Examples of types of transistors include: PMOS MOSFETs, NMOS, MOSFETs, N-type BJTs, P-type BJTs, and insulated-gate bipolar transistors (IGBTs).

Diodes of the transistor-diode pairs may be unidirectional devices configured to conduct current in a single direction. The diodes may be thyristors, for example. Furthermore, the diodes may be discrete diodes or body diodes of the transistors.

The switching circuitry may further comprise additional circuit components connected to the current paths in series with or in parallel with the transistors-diode pairs. For example, the switching circuitry may comprise one or more capacitors, inductors and/or resistors connected in parallel with at least one transistors-diode pair between two points of a particular current path or between two points of two different current paths.

The current paths may be configured to conduct current between at least the first and second nodes of the power conversion circuitry. The current paths may be, for example, electrical cables. The first and second nodes may be different nodes of the same node.

The power conversion circuitry may comprise a plurality of AC nodes for carrying respective phases of an AC and first and second DC nodes for carrying corresponding direct currents. For each AC node, first and second current paths may be connected between a respective AC node and first and second corresponding DC nodes, respectively. The first transistor-diode pairs may be connected along each first current path and the second transistor-diode pairs may be connected along each second current path.

The control circuitry may control the switching circuitry based on a predetermined switching pattern. For example, the control circuitry may be configured to control the transistors of the transistor-diode pairs to turn on and off according to the predetermined switching pattern. The control circuitry may comprise transistor driver circuitry (e.g. gate driver circuitry or base driver circuitry) configured to control the one or more transistors (e.g. according to the predetermined switching pattern).

Under normal operation, the power conversion circuitry may be configured to perform AC to DC conversion, DC to AC conversion or DC to DC conversion by switching the transistors according to the predetermined switching pattern. During normal operation, the transistors may be switched on and off (i.e. between the conducting state and the non-conducting state) at a first transition rate.

Sequentially switching may comprise switching individual transistors one after another in a particular order. Sequential switching may alternatively be referred to as staggered switching.

Current may be determined to have begun to flow through a given diode if current flow is sensed along the current path of the given diode. Alternatively, current may be determined to have begun to flow through a given diode based on the direction of current flow along the current paths. The flow of current may be determined to have begun if current flows through a given diode for at least a predetermined conduction period (e.g. 2, 5 or 10 micro seconds).

The configured transistors may be the transistors which are configured to switch in order for the power conversion circuitry to transition from the first mode of operation to the fault mode of operation (e.g. the second mode of operation corresponding to active rectification or the third mode of operation corresponding to crowbar operation).

Optionally, the switching circuitry may be configured to transition from the first mode of operation to the fault mode of operation by configuring transistors of the given transistor-diode pairs to sequentially switch to the conducting state when current begins to flow through the given diodes in a switching order.

The switching order may be predetermined by the control circuitry or by external circuitry. The switching order may be an order of transistor switching configured to protect the transistors of the transistor-diode pairs from damage due to high fault currents and/or voltages.

Optionally, the given diodes may be diodes corresponding to either the first transistor-diode pairs or the second transistor-diode pairs, the switching order may be a sequential order in which current is determined to begin to flow through the given diodes, and transistors of the given transistor-diode pairs may be configured to remain in the conductive state during the fault mode of operation (e.g. the third mode of operation corresponding to crowbar operation).

In examples where the given diodes are diodes corresponding to either the first transistor-diode pairs or the second transistor-diode pairs only, the fault mode of operation may be crowbar operation.

In examples where the first transistor-diode pairs may be connected along respective first current paths and the second transistor-diode pairs may be connected along respective second current paths, the given diodes may be either (all of) the first transistor-diode pairs or (all of) the second transistor-diode pairs.

The transistors of the given transistor diode pairs may remain in the conductive state (i.e. the on state) until the switching circuitry transitions from the fault mode of operation (e.g. the third mode of operation corresponding to crowbar operation)) to another mode of operation (e.g. a converter mode of operation, the second mode of operation or a shut-down mode).

Optionally, the given diodes may be diodes corresponding to both the first transistor-diode pairs and the second transistor-diode pairs, and the switching order may be a sequential order by which the transistors of the given transistors-diode pairs are switched between the conductive state and the non-conductive state (e.g. during the second mode of operation corresponding to active rectification).

In examples where the given diodes are diodes corresponding to (both) the first transistor-diode pairs and the second transistor-diode pairs, the fault mode may be active/synchronous rectification.

The sequential order may be an order by which AC at AC nodes may be converted to DC at the DC nodes by the transistors (i.e. based on a predetermined switching pattern according to which the transistors switch between a conductive state (on) and a non-conductive state (off)).

In examples where the first transistor-diode pairs may be connected along respective first current paths and the second transistor-diode pairs may be connected along respective second current paths, the given diodes may be (all of) the first transistor-diode pairs and (all of) the second transistor-diode pairs.

Optionally, the fault mode of operation may be a second mode of operation and the power conversion circuitry may be configured to transition from the second mode of operation to a third mode of operation by configuring the control circuitry to identify given diodes as diodes corresponding to either the first transistor-diode pairs or the second transistor-diode pairs, determine, for each current path, when current begins to flow through the given diodes during the second mode of operation, identify an updated switching order as a sequential order in which current is determined to begin to flow through the given diodes, and configuring the switching circuitry to transition from the second mode of operation to the third mode of operation by configuring transistors of the given transistor-diode pairs to sequentially switch to the conducting state when current begins to flow through the given diodes in the updated switching order, and wherein: transistors of the given transistor-diode pairs are configured to remain in the conductive state during the third mode of operation.

In examples where the fault mode of operation is the second mode of operation corresponding to active rectification, the third mode of operation may correspond to crowbar operation.

Optionally, the switching circuitry may be configured to remain in the fault mode of operation for a predetermined fault mode period.

In the fault mode of operation (e.g. the second mode of operation corresponding to active rectification), the transistors of the given transistor-diode pairs may remain in the conductive state (i.e. the on state) for the predetermined fault mode period after which the switching circuitry may transition to another mode of operation (e.g. a normal mode of operation, the third mode of operation or a shut-down mode).

Optionally, the switching circuitry may be configured to remain in the first mode of operation for a predetermined first mode period.

In the first mode of operation, the transistors of the given transistor diode pairs may remain in the conductive state (i.e. the on state) for the predetermined first mode period after which the switching circuitry may transition to another mode of operation (e.g. the fault mode of operation (e.g. the second mode of operation or the third mode of operation), a normal mode of operation or a shut-down mode).

In examples where the fault mode of operation is the second mode of operation, the switching circuitry may be configured to remain in the first mode of operation (i.e. passive rectification) and/or the second mode of operation (i.e. active rectification) until any DC side voltage at the DC nodes is passed to the AC terminals of the power conversion circuitry (i.e. as defined by the predetermined first mode period and/or the predetermined fault mode period). This may act in a positive manner to drive the fault current to a lower value than would be achieved by immediately transitioning to another mode of operation.

Optionally, the power conversion circuitry may comprise current sensors coupled to each current path, the current sensors configured to detect a direction in which current is flowing along the respective current path, and the control circuitry may be configured to determine when current begins to flow through the given diodes based on the direction of current detected by the respective current sensor.

The current sensors may be an electrical component configured to measure current flowing along the current path (e.g. in Amperes). A rate of change of current flowing along the current path may be determined by measuring the flow of current along the current path over a predetermined duration (e.g. 2 micro seconds).

The current sensors may be connected to respective current paths between respective AC nodes and the switching circuitry such that the current sensors are configured to detect current flowing along those current paths when one of the transistors and diodes of the transistor-diode pairs conduct current.

Optionally, the control circuitry may determine diode conduction periods of the given diodes based on the direction of current detected by the respective current sensor, and the switching circuitry may configure transistors of the given transistor-diode pairs to sequentially switch to the conducting state either: at a start of the corresponding diode conduction period, or after a predetermined dwell time after the start of the corresponding diode conduction period.

If the direction of current is determined, by the respective current sensor, to be the direction in which a corresponding given (unidirectional) diode is configured to conduct, the control circuitry may determine that current has begun to flow through that given diode.

If the direction of current is determined, by the respective current sensor, to be the opposite direction in which a corresponding given (unidirectional) diode is configured to conduct, the control circuitry may determine that current has not begun to flow through that given diode.

Optionally, the plurality of current paths may each comprise: a first transistor-diode pair comprising a first transistor and a first diode connected in anti-parallel with each other along a first circuit branch between a first node and a second node, and a second transistor-diode pair comprising a second transistor and a second diode connected in anti-parallel with each other along a second circuit branch between the first node and the second node, the second nodes of the respective circuit branches being connected together.

The first nodes may be AC nodes and the second nodes may be DC nodes.

An anti-parallel connection may be a connection whereby the terminals of two devices (e.g. a transistor and a diode) are connected between two nodes in opposite configurations (e.g. positive and negative terminals of the two devices are in the opposite configurations).

The second nodes of the respective current branches may be connected together such that currents (only) flow between the current paths when (all) the transistors of the given transistor-diode pairs are switched to the conductive state and (all) other transistors remain in the non-conductive state.

Optionally, the plurality of current paths may each comprise: a first transistor-diode pair comprising a first transistor and a first diode connected in anti-parallel with each other along a first circuit branch between a first node and a second node, and a second transistor-diode pair comprising a second transistor and a second diode connected in anti-parallel with each other along a second circuit branch between the first node and the second node, the second nodes of the respective circuit branches being connected together, wherein the control circuitry may be configured to: determine given diodes as either the first diodes of the first transistor-diode pairs or the second diodes of the second transistor-diode pairs, determine, for each current path, when current begins to flow through the given diodes during the first mode of operation, and configure transistors of the given transistor-diode pairs to sequentially switch to the conducting state when current begins to flow through the given diodes in the switching order such that currents only flow between branches of the current paths corresponding to the configured transistors during the fault mode of operation.

Optionally, in examples where the fault mode of operation is a second mode of operation, the plurality of current paths may each comprise a first transistor-diode pair comprising a first transistor and a first diode connected in anti-parallel with each other along a first circuit branch between a first node and a second node, and a second transistor-diode pair comprising a second transistor and a second diode connected in anti-parallel with each other along a second circuit branch between the first node and the second node, the second nodes of the respective circuit branches being connected together, wherein the control circuitry is configured to: determine given diodes as either the first diodes of the first transistor-diode pairs or the second diodes of the second transistor-diode pairs, determine, for each current path, when current begins to flow through the given diodes during the second mode of operation, and configure transistors of the given transistor-diode pairs to sequentially switch to the conducting state when current begins to flow through the given diodes in the switching order such that currents only flow between branches of the current paths corresponding to the configured transistors during the third mode of operation.

Optionally, the plurality of current paths may comprise first, second and third current path.

Currents may flow along the first, second and third current paths between respective AC nodes of a three phase AC supply and respective DC nodes connected to a DC network.

Optionally, the switching circuitry may be configured to transition, when an electrical fault is detected in the power converter circuitry, from a converter mode of operation, in which the currents are converted from AC to DC to the first mode of operation.

That is, before transitioning to the first mode of operation (i.e. upon detecting an electrical fault), the switching circuitry may be operating in a converter mode of operation in which currents flowing along the current paths are converter from AC to DC.

Optionally, the transistors of the transistor-diode pairs may be bi-directional transistors.

The control circuitry may configure the switching circuitry to transition from the first mode of operation to the fault mode of operation by configuring bidirectional transistors of the given transistor-diode pairs to sequentially switch between a reverse conducting state and a forward conduction state when current begins to flow through the given diodes such that currents flow along the respective current paths through the configured transistors during the fault mode of operation (i.e. crowbar mode of operation or active synchronisation mode of operation).

The bi-directional transistors may be field effect transistors (e.g. MOSFETs or JFETs) or bi-directional bipolar junction transistor (e.g. B-TRANS).

Optionally, the power converter circuitry may be a three-phase bridge circuit.

That is, the power conversion circuitry may be a three-phase bridge circuit comprising six pairs of transistors connected between the first and second nodes as two or three circuit legs.

Optionally, the switching circuitry may be a bidirectional AC to DC converter.

According to a second aspect there is provided a method of controlling power conversion circuitry to transition between modes of operation during an electrical fault, the power conversion circuitry comprising: switching circuitry configured to control currents flowing along a plurality of current paths between respective pairs of nodes of the power conversion circuitry, wherein the plurality of current paths each comprise first and second transistor-diode pairs connected along the respective current path, the method comprising: configuring the switching circuitry to transition, when an electrical fault is detected, to a first mode of operation by switching transistors of the transistor-diode pairs to a non-conducting state such that currents flow along the respective current paths through diodes of the transistor-diode pairs during the first mode of operation, determining, for each current path, when current begins to flow through a given diode of a given transistor-diode pair during the first mode of operation, and configuring the switching circuitry to transition from the first mode of operation to a fault mode of operation by sequentially switching transistors of the given transistor-diode pairs to a conducting state when current begins to flow through the given diodes such that currents flow along the respective current paths through the configured transistors during the fault mode of operation.

According to a third aspect, there is provided a computer-readable medium comprising instructions which, when executed on a computer of power conversion circuitry, cause the computer to perform the method of the second aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1

Figure 1:
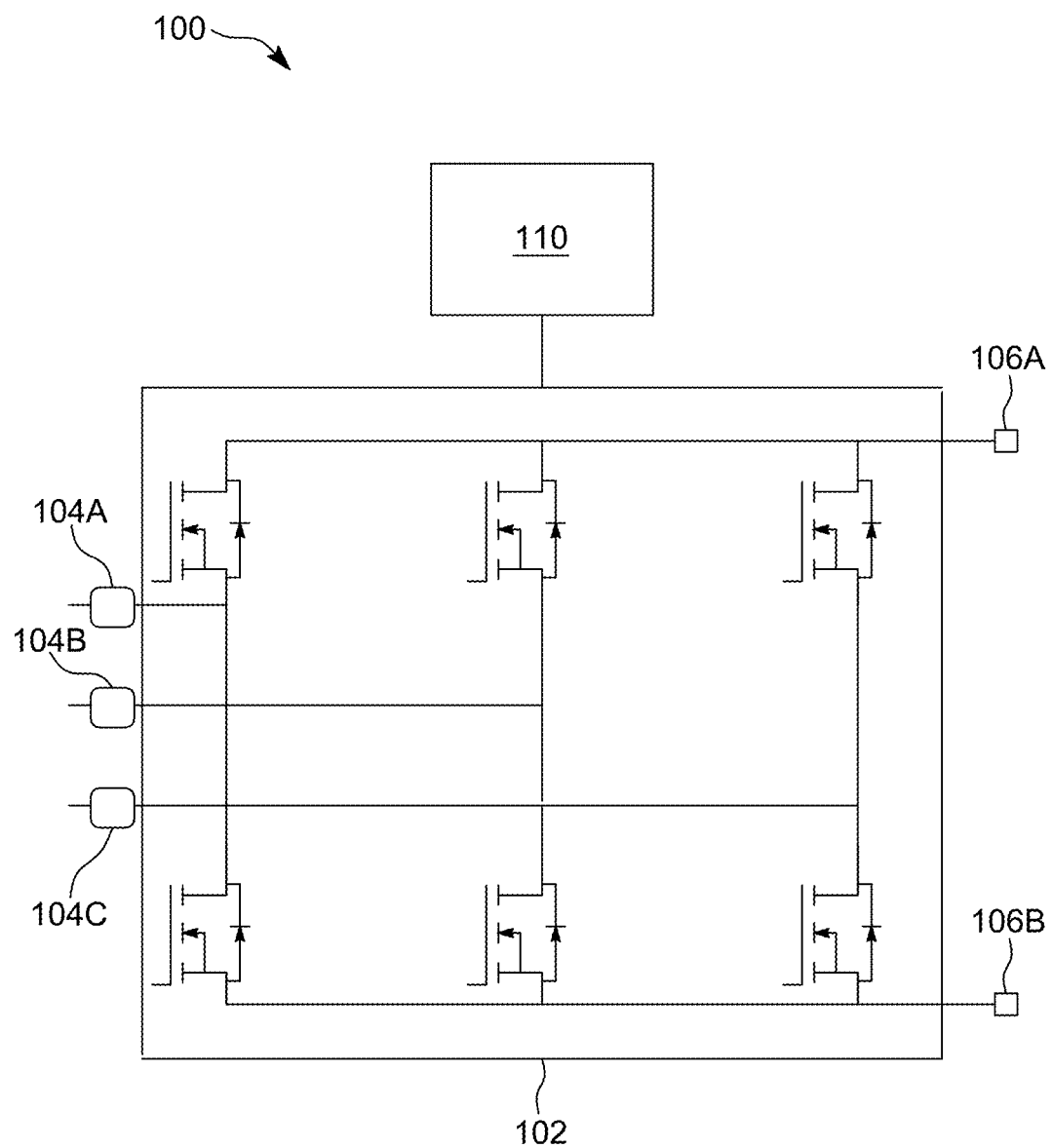
FIG. 1 is a schematic diagram of power conversion circuitry.

Exemplary power conversion circuitry 100 configured to transition between modes of operation during an electrical fault is shown in FIG. 1.

The power conversion circuitry 100 may transition between modes of operation due to an electrical fault located within the power conversion circuitry 100 and/or within a (DC) network (not shown) connected to the power conversion circuitry 100. An electrical fault may be any electrical fault resulting in an overcurrent and/or overvoltage that exceeds the fault threshold. For example, the electrical fault may be a short circuit at the output of the power conversion circuitry 100, or a short circuit of the power conversion circuitry 100 itself, such as a shoot through fault.

Referring to FIG. 1, the power conversion circuitry 100 comprises switching circuitry 102 configured to control currents flowing along a plurality of current paths between respective pairs of nodes. Each current path comprises first and second transistor-diode pairs connected along the respective current path for controlling the currents. The power conversion circuitry further comprises control circuitry 110 connected to the switching circuitry 102. The control circuitry 110 configures the switching circuitry 102 (and thereby the power conversion circuitry 100 as a whole) to transition between modes of operation.

The power conversion circuitry 100 may comprise a plurality of current paths connected between respective pairs of nodes. However, for ease of explanation, the following description will describe an example in which currents flow along first second and third current paths between first, second and third AC supply nodes 104A, 104B, 104C, for carrying respective phases of AC, and first and second DC nodes 106A, 106B for carrying corresponding direct currents, respectively.

A current path may be connected between a respective AC node and the first and second DC nodes. The DC nodes may be connected together via a load, such as a DC network. For each current path, current may flow from its respective AC node, through the switching circuitry 102, through both the DC nodes 106A, 106B, and back to the respective AC node via the switching circuitry 102. The AC nodes may be connected between respective first and second transistor-diode pairs, as illustrated in FIG. 1.

In some examples, each current path may be divided into two portions or branches (for the purposes of explanation). In such examples, first and second current paths may be connected between respective AC nodes and the first and second DC nodes, respectively. The first transistor-diode pairs may be connected along their respective first current paths and the second transistor-diode pairs may be connected along their respective second current path, as illustrated in FIG. 1.

It will be understood that alternative configurations may be possible in which additional respective current path(s) may be connected between a respective AC node and the first and second DC nodes in a different configuration to that illustrated in FIG. 1.

The switching circuitry 102 may be connected directly to the current path or may be indirectly connected to the current path via intermediate electronic components and/or circuitry (e.g. capacitors, resistors and/or inductors). The switching circuitry 102 may be an H-bridge AC to DC converter. Alternatively, the switching circuitry 102 may be a H-bridge DC to AC converter. That is, current may be controlled by the switching circuitry 102 to perform AC to DC conversion, DC to AC conversion, or bidirectional AC to DC conversion.

The transistors of the transistor-diode pairs may be MOSFETs, B-TRANs or IGBTs configured to switch on and off (i.e. between a conductive state and a non-conductive state) according to a predetermined switching pattern, for example using transistor driver circuitry. For MOSFETS, gate driver circuitry may be used. The transistors may be configured to switch on and off at different times according to the predetermined switching pattern.

The transistors and diodes of a transistor-diode pair may be connected in an anti-parallel arrangement whereby the terminal of the two devices are connected between the same two nodes in opposite configurations (e.g. the positive and negative terminal of the two devices are in the opposite configurations).

Additional circuit components (as discussed below in relation to FIG. 5) may be connected to the current paths in series with or in parallel with the one or more transistors. For example, the switching circuitry 102 may comprise one or more capacitors, inductors and/or resistors connected in parallel or in series with the one or more transistors between two points of a current path or between two different current paths. The diodes of the transistor-diode pairs may be unidirectional devices configured to conduct current in a single direction. The diodes may be thyristors, for example.

The control circuitry 110 is configured to configure (i.e. control) the switching circuitry to transition between different modes of operation. Modes of operation may be configurations of the power conversion circuitry which control the currents to flow along the current paths in a particular manner. Different modes may configure the power conversion circuitry into different arrangements such that currents are controlled to flow along the current paths in different directions and/or flow along different combinations of current paths.

The first mode of operation may be referred to as a blocked mode or a passive rectification mode (i.e. passive rectification of an AC at the first node to DC at the second node using conducting diodes).

The switching circuitry may be configured to remain in the first mode of operation for a predetermined first mode period (i.e. until a switching pattern required for sequential transistor switching has been obtained).

Under normal operation (e.g. a converter mode of operation), the power conversion circuitry 100 may be configured to convert ACs flowing from the AC nodes 104A, 104B, 104C to DC at the DC nodes 106A, 106B. The conversion of AC to DC may be performed by the transistor-diode pairs by switching the transistors according to the predetermined switching pattern. Therefore, when an electrical fault is detected (e.g. by the control circuitry 110 or by external circuitry which informs the power control circuitry 100 that an electrical fault has occurred), the power conversion circuitry 100 may react to the presence of an electrical fault by transitioning from the converter mode of operation to the first mode of operation. The first mode of operation may be designed to protect the power conversion circuitry 100 from damage due to high fault currents and/or voltages.

The switching circuitry 102 transitions into the first mode of operation by controlling (all of) the transistors of the transistor-diode pairs to stop conducting current. By switching the transistors to a non-conducting state, current may flow through the diodes of the transistor-diode pairs in the direction allowed by those diodes. As a consequence of this unidirectional current flow through the diodes, the alternating currents at the AC nodes 104A, 104B, 104C are rectified to a DC at the DC nodes 106A, 106B once the switching circuitry 102 has fully transitioned into the first mode of operation (i.e. all the transistors have been turned off).

Once the switching circuitry 102 has fully transitioned into the first mode of operation, the control circuitry may determine diode conduction periods during which the diodes of the transistor-diode pairs conduct current. The diode conduction periods may be determined based on a direction in which current is flowing through the transistor-diode pair of a diode. The direction of current may be determined by current sensors 105A, 105B, 105C which may be respectively connected to the AC nodes 104A, 104B, 104C of the power conversion circuitry 100. For example, if the direction of current is determined, by the respective current sensor, to be the direction in which a corresponding (unidirectional) diode is configured to conduct current, the control circuitry 110 may determine that current has begun to flow through that diode. If the direction of current is determined to be the opposite direction in which a corresponding diode is configured to conduct current, the control circuitry 110 may determine that current is flowing in a transistor of the transistor-diode pair instead (i.e. current has not begun to flow in the diode).

The control circuitry 110 may determine that current has begun to flow through a diode at the start of a corresponding diode conduction period. For example, the flow of current may be determined to have begun if current flows through a given diode for at least a predetermined conduction period (e.g. 2, 5 or 10 micro seconds).

Alternatively, the control circuitry 110 may determine that current has begun to flow through a diode after a predetermined dwell time after the start of the corresponding diode conduction period. The predetermined dwell time may allow current to flow through the diode for an extended period of time before the transistor for that transistor-diode pair is turned on.

The switching circuitry 102 may be configured to transition from the first mode of operation to a fault mode of operation based on knowledge of when given diodes are determined to have begun to conduct current.

It will be understood that the given diodes (and corresponding given transistor-diode pairs) may be any diodes of the switching circuitry 102. The selection of which specific diodes are the given diodes may be made by the control circuitry 110 according to the mode of operation required during the fault mode of operation, as discussed in more detail below.

The fault mode of operation may be a second mode of operation in which synchronous rectification is executed (e.g. where certain transistors are switched on and off to rectify AC). Alternatively, the fault mode of operation may be a third mode of operation in which crowbar operation is executed (e.g. where certain groups of transistors are turned on and other groups of transistors are turned off to prevent current flowing to an output node).

The first, second and third modes of operation may be consecutive modes of operation whereby the switching circuitry 102 may be configured to transition from the first mode of operation to the second mode of operation and then, optionally, to the third mode of operation. Alternatively, the first, second and third modes of operation may be non-consecutive modes of operation whereby the switching circuitry 102 may transition directly from the first mode of operation to the third mode of operation without entering the second mode of operation.

In some examples, the first and second transistor-diode pairs are connected between upper and lower nodes as legs of the switching circuitry 102. The upper nodes may all be connected to the upper DC node 106A and the lower nodes may be all connected to the lower DC node 106B. Furthermore, the transistors may be bidirectional transistors. It will be understood that in such a configuration, when bidirectional transistors are used in the transistor-diode pairs, current will only flow between the switching circuitry 102 and the AC nodes 104A, 104B, 104C. That is, when all of the first transistors are turned on and all of the second transistors are turned off (or vice versa) current will only flow between the current paths (for example through an AC generator attached to the AC nodes 104A, 104B, 104C), due to the bidirectional transistors conducting in the forward and reverse directions when required. Current may not flow to the DC nodes 106A, 106B (e.g. towards a DC network).

The switching circuitry 102 may be configured to transition from the first mode of operation to the fault mode of operation (e.g. the second mode of operation corresponding to active rectification or the third mode of operation corresponding to crowbar operation) by switching given transistors of given transistor-diode pairs according to a specific switching order. The switching order may be determined by the control circuitry 110 itself or the switching order may be obtained by the control circuitry 110 from external circuitry (not shown).

The switching order used by the control circuitry 110 and the given transistor-diode pairs may depend on the mode of operation required during the fault mode of operation (e.g. active rectification or crowbar operation). For example, if crowbar operation is required during the fault mode of operation (i.e. the third mode of operation), a group of transistor-diode pairs may be identified as the given transistor-diode pairs. Alternatively, if active rectification is required during the fault mode of operation (i.e. the second mode of operation), all of the transistor-diode pairs may be identified as the given transistor-diode pairs.

During transition from the first mode of operation to the fault mode of operation, the given transistors may be configured to sequentially switch from a non-conducting state to a conducting state. The sequential switching of the given transistors according to the switching order may allow the switching circuitry 102 to transition to the second mode of operation during an electrical fault safely with minimal risk of damaging the given transistors.

FIG. 2

Figure 2:
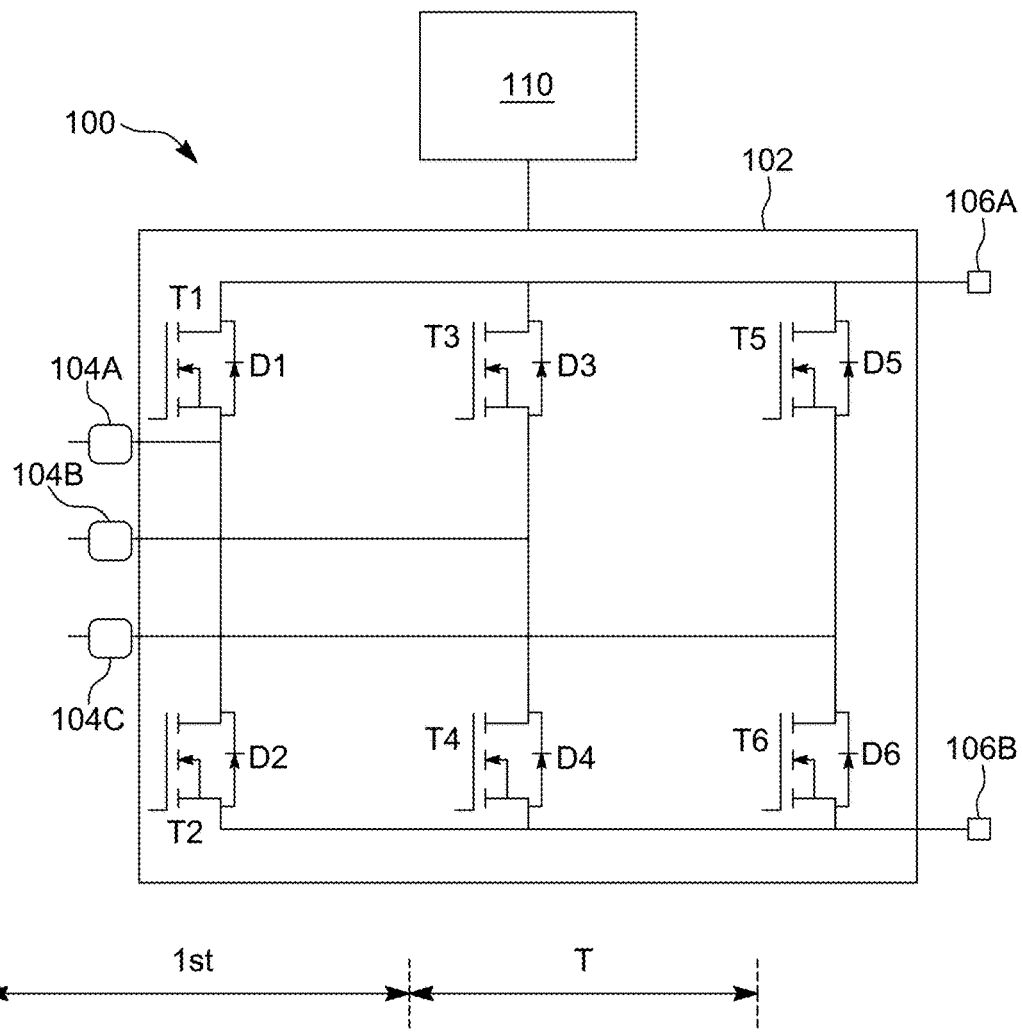
FIG. 2 is another schematic diagram of power conversion circuitry also illustrating sequential switching.
Figure 2:
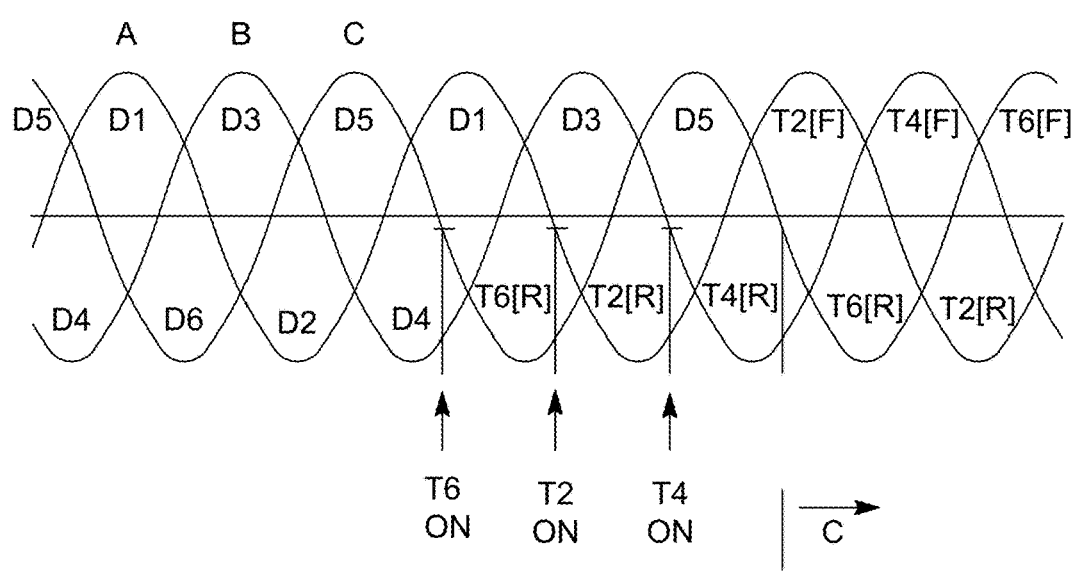

A first example of sequentially switching the given transistors is illustrated in FIG. 2. The power conversion circuitry of FIG. 2 is the same as power circuitry 100 of FIG. 1. The transistors of the first transistors-diode pairs are labelled T1, T3 and T5 and the transistors of the second transistor-diode pairs are labelled T2, T4 and T6. The diodes of the first transistor-diode pairs are labelled D1, D3 and D5 and the diodes of the second transistor-diode pairs are labelled D2, D4 and D6. Three phases of AC are labelled as A, B and C, which correspond to currents flowing on the first, second and third AC nodes 104A, 104B, 104C, respectively.

In the example of FIG. 2, the fault mode of operation is the third mode of operation which provides crowbar operation, and the given transistor-diode pairs are the second transistor-diode pairs (labelled as T2-D2, T4-D4 and T6-D6 in FIG. 2).

FIG. 2 includes a graph which illustrates how AC side currents may be controlled based on sequential switching. The FIG. 2 graph illustrates when current flows through particular devices across a time period in the direction from left to right.

In the example of FIG. 2, the first mode of operation may be referred to as a blocked mode (represented in the graph by the time period "1st") and the graph illustrates sequential switching of the given transistors during a transition state period (represented in the graph by the time period "T"). A start of the crowbar control mode (i.e. third mode of operation) is illustrated in the graph of FIG. 2 by the arrow labelled "C".

It can be seen from FIG. 2 that the switching order during the third mode of operation, for this example, is a sequential order in which current is determined to begin to flow through the given diodes. That is, the sequential order in which the given transistor turn on is T6 then T2 then T4. T6 is turned on when current begins to flow through D6, T2 turns on when current begins to flow through D2 and T4 turns on when current begins to flow through D4. The given transistors T2, T4 and T6 may conduct current bidirectionally in order to achieve the crowbar operation. The direction in which a given transistor conducts current for a given period of time is illustrated in the graph of FIG. 2 with "[F]", which indicates the given transistor is conducting current in a forward direction (i.e. forward current flow for that transistor), and with "[R]", which indicated the given transistor is conducting current in a reverse direction (i.e. reverse current flow for that transistor).

The given transistors may be configured to remain in the conductive state during the fault mode of operation (for the predetermined fault mode period), while the switching circuitry 102 remains configured for crowbar functionality).

At the end of the three-stage switching action, all three lower transistors may be switched on carrying current in both forward [F] and reverse [R] directions in the crowbar mode of operation.

FIG. 3

Figure 3:
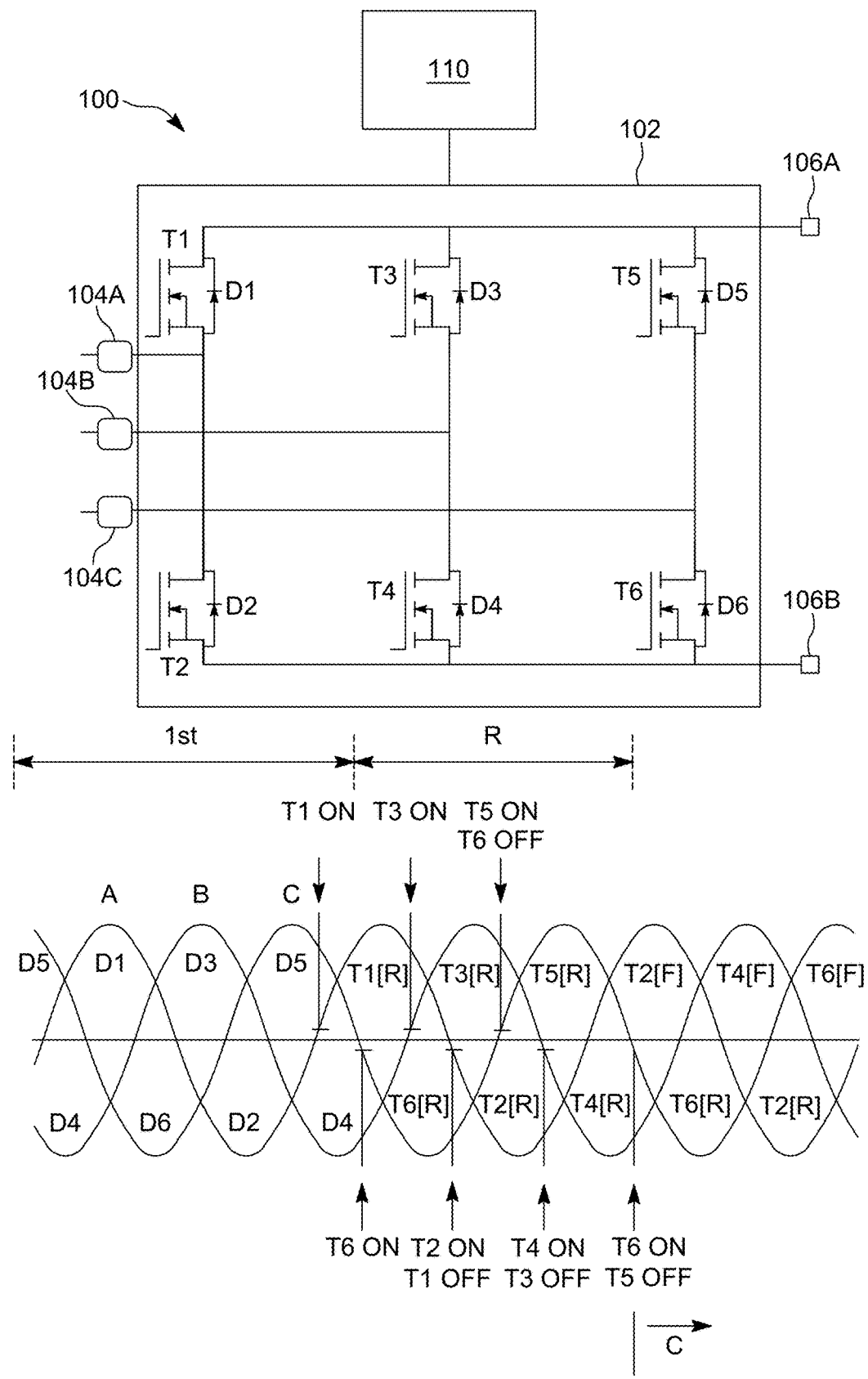
FIG. 3 is another schematic diagram of power conversion circuitry also illustrating different sequential switching.

A second example of sequentially switching the given transistors is illustrated in FIG. 3. The power conversion circuitry illustrated in FIG. 3 is the same as power conversion circuitry 100 of FIG. 1. The transistor-diode pairs are labelled in the same way as in FIG. 2.

In the example of FIG. 3, the fault mode of operation is the second mode of operation which provides active (synchronous) rectification whereby AC flowing in the AC nodes 104A, 104B, 104C is rectified to DC at the DC nodes 106A, 106B according to the predetermined switching pattern for the given transistors. The example of FIG. 3 includes the third mode of operation to which the switching circuitry transitions from the second mode of operation (i.e. the third mode of operation as discussed above in relation to FIG. 2). The third mode of operation in the example of FIG. 3 corresponds to crowbar operation. It will be understood that the switching circuitry 102 may transition from the first mode of operation to the second mode of operation, in which active rectification is performed, without subsequently transitioning to the third mode of operation.

FIG. 3 includes a graph which illustrates how AC side currents may be controlled. The FIG. 3 graph illustrates when current flows through particular devices across a time period in the direction from left to right.

In the example of FIG. 3, the first mode of operation may be referred to as a blocked mode (represented in the graph by the time period "1st") and the graph illustrates sequential switching of the given transistors during active rectification (represented in the graph by the time period "R"). A start of crowbar operation is illustrated in the graph of FIG. 3 by the arrow labelled "C".

It can be seen from FIG. 3 that the switching order during the second mode of operation, for this example, is a sequential order by which the transistors of the given transistors-diode pairs are switched between the conductive state and the non-conductive state in order to perform active rectification. That is, the sequential order in which the given transistor switch during the second mode of operation, in this example, is as follows:

T1 on;
T6 on;
T3 on;
T2 on at the same time as T1 off;
T5 on at the same time as T6 off;
T4 on at the same time as T3 off;
T6 on at the same time as T5 off.

The direction in which each given transistor conducts current (i.e. in the forward direction or the reverse direction) is indicated in the graph of FIG. 3 with "[F]" and "[R]".

In the above switching pattern, the given transistors are turned on when the corresponding given diode begins to conduct current and are turned off when the corresponding given diode turns on (e.g. T1 turns on when current begins to flow through D1 and T1 turns off when current stops flowing through D1). The given transistors may be configured to remain in the conductive state during the second mode of operation (i.e. while the switching circuitry 102 remains configured for active rectification).

The switching circuitry 102 of the FIG. 3 example may transition from the second mode of operation (i.e. active rectification) to the third mode of operation (i.e. crowbar functionality) in the same way as the transition from the first mode of operation to the third mode of operation is described above in relation to the example of FIG. 2.

In some examples, the switching circuitry may remain in the first mode of operation (i.e. passive rectification) and/or the second mode of operation (i.e. active rectification) for an extended period of time which is longer than the predetermined first mode period and/or predetermined fault mode period. Remaining in the first mode of operation or the second mode of operation for the extended period of time may be helpful in reducing the fault currents flowing through the power conversion circuitry 100.

FIG. 4

Figure 4:
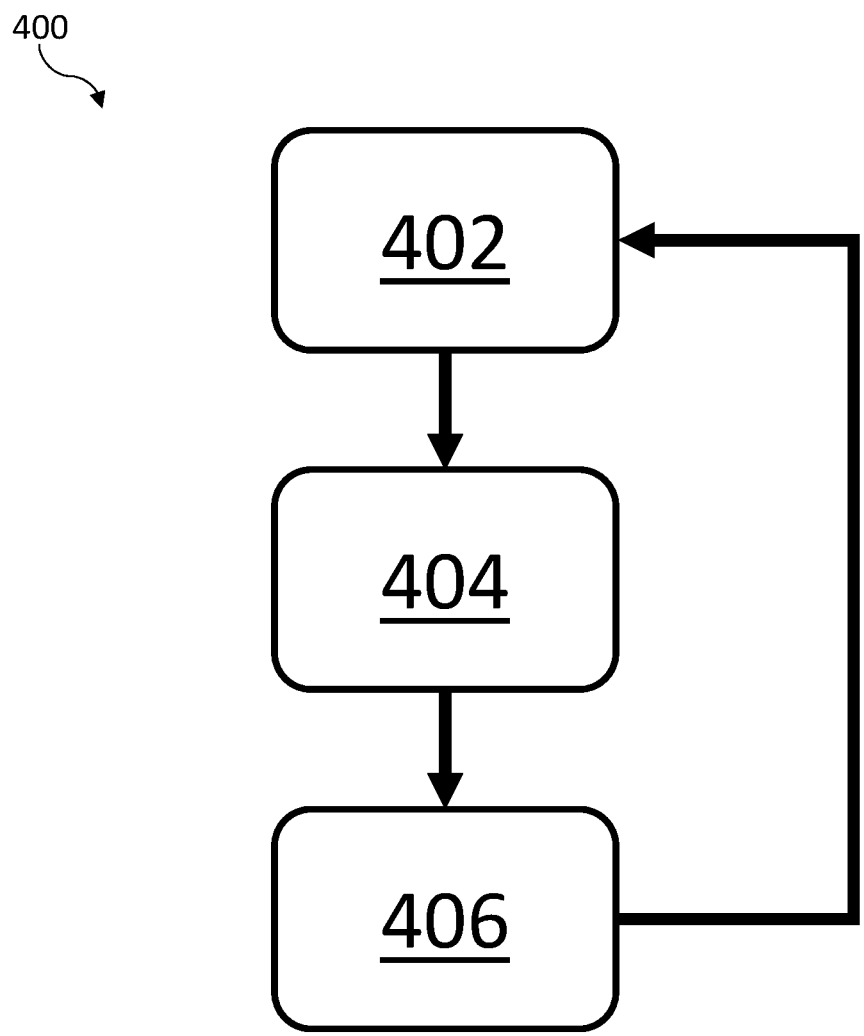
FIG. 4 is a schematic representation of a method of transitioning between modes of operation during an electrical fault.

An exemplary method 400 of controlling power conversion circuitry 100 to transition between modes of operation during an electrical fault is shown in FIG. 4. The method comprises:

402 configuring switching circuitry to transition, when an electrical fault is detected, to a first mode of operation by switching transistors of transistor-diode pairs to a non-conducting state such that currents flow along the respective current paths through diodes of the transistor-diode pairs during the first mode of operation;

404 determining, for each current path, when current begins to flow through a given diode of a given transistor-diode pair during the first mode of operation; and 406 configuring the switching circuitry to transition from the first mode of operation to a fault mode of operation by sequentially switching transistors of the given transistor-diode pairs to a conducting state when current begins to flow through the given diodes such that currents flow along the respective current paths through the configured transistors during the fault mode of operation.

The control method 400 should be understood to control the power conversion circuitry 100 to function as described above.

In any of the above examples, the various features may be implemented in hardware, or as software modules running on one or more processors/computers. For example, the method 400 may be implemented with a computer-readable medium comprising instructions which, when executed on a computer of power conversion circuitry, cause the computer to perform the method 400.

Examples also provide a computer program or a computer program product comprising instructions which, when executed by a computer, cause the computer to carry out any of the methods/method steps described herein, and a non-transitory computer-readable medium comprising instructions which, when executed by a computer, cause the computer to carry out any of the methods/method steps described herein. A computer program embodying the disclosure may be stored on a non-transitory computer-readable medium, or it could, for example, be in the form of a signal such as a downloadable data signal provided from an Internet website, or it could be in any other form.

FIG. 5

Figure 5:
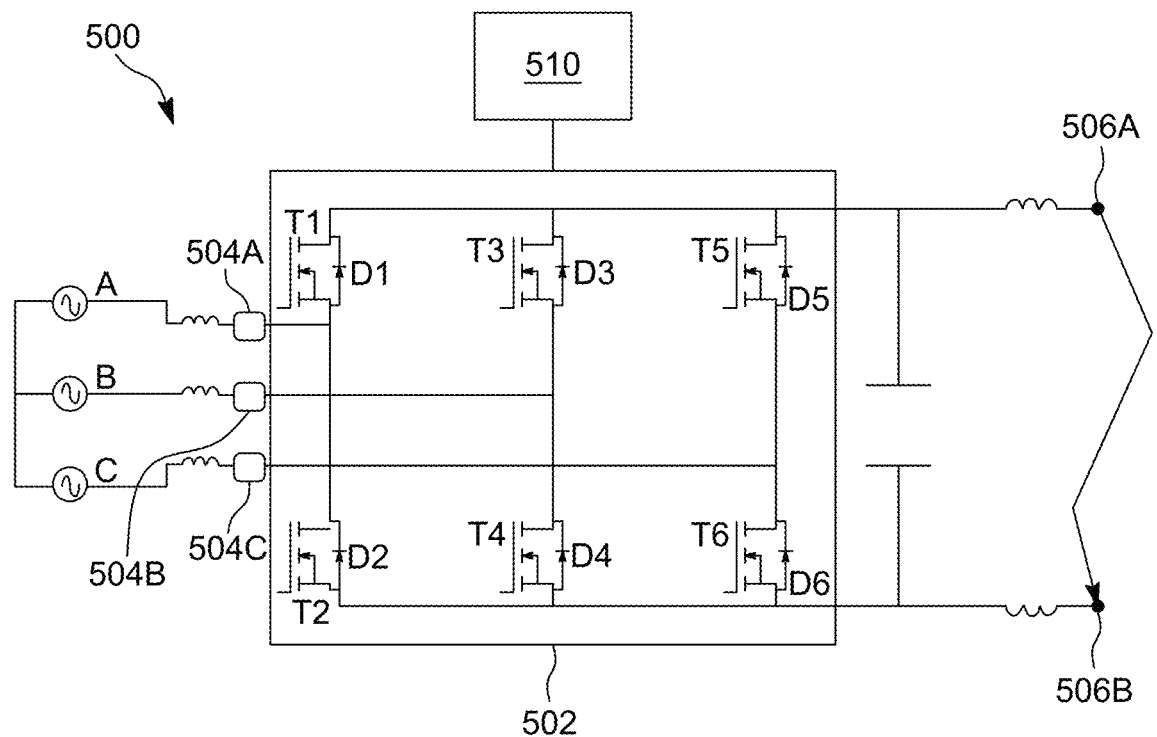
FIG. 5 is another schematic diagram of power conversion circuitry.

In another example illustrated in FIG. 5, the power conversion circuitry is a two-level, six-switch AC to DC converter (referred to from hereon as power converter circuitry 500). The power converter circuitry 500 includes at least the same components and features as power conversion circuitry 100. Therefore, where the same components or features are used, like terminology will be used in the following description and a repeated description of these components or features will be omitted for brevity. The power conversion circuitry 500 includes an output capacitor and output inductances between the switching circuitry and DC terminals 506A, 506B. A DC side fault is illustrated with the zig-zag arrow between the DC terminals 506A, 506B.

A first phase leg comprises transistor-diode pairs T1-D1 and T2-D2. A second phase leg comprises transistor-diode pairs T3-D3 and T4-D4. A third phase leg comprises transistor-diode pairs T5-D5 and T6-D6.

The arrangement of transistor-diode pairs in the power conversion circuitry may be describes with respect to phase legs, as follows. A first phase leg may comprise transistor-diode pairs T1-D1 and T2-D2. A second phase leg may comprise transistor-diode pairs T3-D3 and T4-D4. A third phase leg may comprise transistor-diode pairs T5-D5 and T6-D6.

When an electrical fault is detected, the power converter circuitry 500 is configured to form a symmetrical three-phase short circuit which prevents or minimises the current fed to a DC network at DC terminals 506A, 506B of the power conversion circuitry 500. This three-phase short circuit is referred to as crowbar operation and is used to reduce the level of current interrupted by a DC contactor for example which avoids power arcs and increases the lifetime of contacts. This crowbar control mode may correspond to the third mode of operation discussed above in relation to power conversion circuitry 100.

During an electrical fault (e.g. when there is a zero impedance short circuit applied to the DC network across the DC nodes 506A, 506B) both DC and AC sides of the converter are nominally at zero voltage (neglecting the diode voltage drops). The fault current is mainly controlled by the back electromotive force (EMF) and reactance of an AC generator connected to AC terminals 504A, 504B, 504C of the power conversion circuitry.

When applying advanced wide band-gap semiconductors to the power electronic converter 500, the transistors of the transistor-diode pairs may be silicon carbide MOSFETs. Silicon carbide MOSFETs are capable of carrying current in both the reverse and forward directions (i.e. bidirectional), and therefore discrete diodes may be omitted from the power converter circuitry 500 in preference to the body diodes of the silicon carbide MOSFETs. Where bidirectional MOSFETs are used, body diodes are inherently present in the MOSFETS and can also conduct if desired for example to assist in commutating current between the six semiconductor switches.

As described above, the AC terminals 504A, 504B, 504C of the power converter circuitry 500 assume a nominal zero voltage condition during a DC fault. In the presence of a sinusoidal back EMF at the AC generator, the current flowing into the AC terminals 504A, 504B, 504C are sinusoidal and 120 degrees apart at each phase for a traditional three-phase AC generator.

Turning back to crowbar operation, the converter transitions into crowbar operation by switching the above discussed MOSFETs. Referring to FIG. 5, all of the upper MOSFETs may be switched on (at the same time as all the lower MOSFETs being switched off) such that an AC side fault current circulates between the AC generator and the power control circuitry 500 in crowbar operation and does not flow to the DC network. It will be understood that the same operation may be achieved by switched all the lower MOSFETs on (at the same time as all the upper MOSFETs being switched off). In both arrangements of crowbar operation, the MOSFETS conduct in both their reverse and forward directions.

In some examples, the power conversion circuitry 500 may alternate crowbar operation between using all the lower MOSFETS and all the upper MOSFETS thereby providing a means of sharing the fault current between all six MOSFETs and help to equalise and minimise their individual junction temperatures.

The transistors and diodes of the transistor-diode pairs are labelled in the power conversion circuitry 500 of FIG. 5 in the same way as the power conversion circuitry 100 of FIG. 2. As discussed above, it is understood that the diode could be either the body diode or an external discrete diode. The sequenced switching of the transistors in three phase legs of the power conversion circuitry 500 in order to transition from a rectifier mode (i.e. first mode of operation) to the crowbar control mode of operation (e.g. third mode of operation) is the same as the switching order illustrated in the graph of FIG. 2.

When an electrical fault is detected, the power conversion circuitry 500 may be configured to change to passive (uncontrolled) rectification or crowbar control mode of operation, or move into them from a different operating mode, such that the transistors are sequentially turned on when the current is flowing in their anti-parallel diode. As such the transistors turn-on with low current which minimises switching losses and reduces a rate of change of current. The reduction in rate of change of current reduces electromagnetic interference generated by the converter.

The power conversion circuitry 500 may be initially configured to operate in a blocked state when an electrical fault is detected with all transistors switched off (i.e. passive rectification during a first mode of operation). The current in each of diodes D1 to D6 may be half sinusoid (180 electrical degrees). During the transition to crowbar operation, the power converter circuitry 500 may operate in a transition state in which transistor T6 is initially turned on when the current transfers from D5 to D6 (i.e. T6 is turned on when the current is in its antiparallel diode). 120 degrees later, transistor T2 is turned on when the current transfers from diode D1 to D2. 120 degrees after that, transistor T4 is turned on when the current transfers from diode D3 to D4. At the end of the three-stage switching action, all three lower transistors are switched on carrying current in both the forward [F] and reverse [R] direction in the crowbar mode of operation. The direction of the current may be determined by current sensors (not shown) in each of the AC terminals 504A, 504B, 504C.

In the transition state, the power conversion circuitry 500 may continue to operate as a passive rectifier passing current to the DC network until all three lower transistors T2, T4 and T6 are switched on. In some examples, the transition state could be an active/synchronous rectification mode where the MOSFETs are turned-on to carry current in their reverse direction. This may require a more complex sequence of transistor switching again where turn-on occurs with current in the anti-parallel diode and associated turn-off of the other transistor in the same phase leg, as shown in the graph of FIG. 3. In examples where the power conversion circuitry 500 operates as an active/synchronous rectifier in the transition state, the transition state corresponds to the second mode of operation, discussed above, and crowbar operation corresponds to the third mode of operation, discussed above.

Therefore, by staggering the turn-on (and optionally the turn-off) of the MOSFETs such that switching occurs when current has just started to flow (i.e. at a low value) in the anti-parallel diode, the voltage at the switching instant is very low as defined by the diode forward voltage drop. As such, the switching loss is minimal with the rate of change of current also low. This soft voltage switching may be maintained even in conditions when appreciable DC voltage remains present as the MOSFET turn-on occurs at a voltage set by the diode forward voltage drop rather than the external DC network voltage.

In the event of a severe fault and synchronous rectification is applied in the second mode of operation, the MOSFETs in the same phase leg (e.g. T1 and T2) may be turned off and on respectively with a small dead-time (sometimes referred to as the "underlap" time) to avoid a shoot through event if both transistors are on at the same time. This underlap period leaves the phase leg in in a blocked state with only diodes conducting but normally is very small and typically the order of a few micro seconds.

In some examples, a dwell time may be used when a phase leg remains in the blocked state for a longer time (short enough for the body diodes to withstand the fault currents), but long enough to positively reduce the amount of fault current flowing in the parallel MOSFET. The use of a dwell time will be discussed in more detail below with reference to FIG. 6.

FIG. 6

Figure 6:
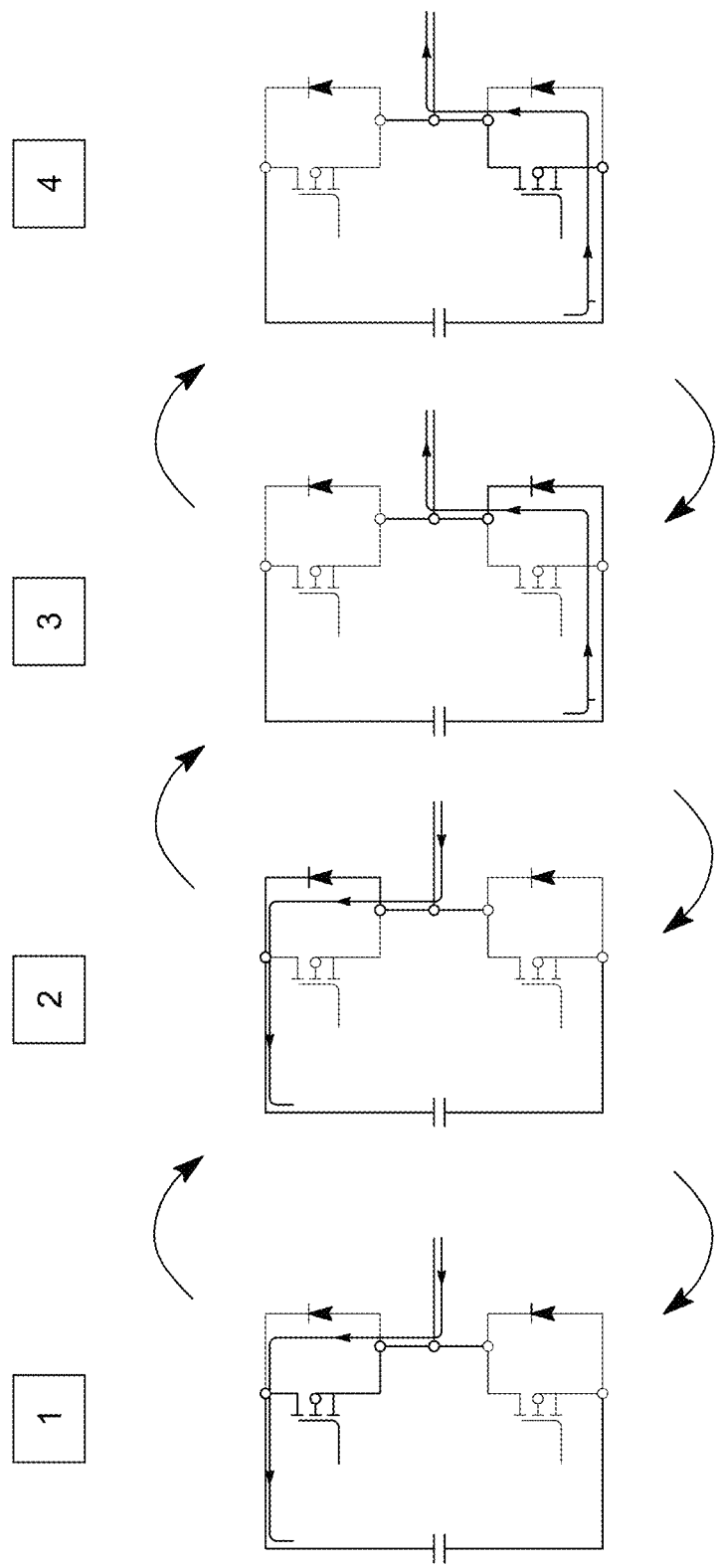
FIG. 6 is a schematic diagram illustrating switching during a dwell time.

FIG. 6 illustrates a four stage sequence of switching for power conversion circuitry 500 between MOSFET T1 on (i.e. a first stage) and MOSFET T2 on (i.e. a fourth stage) with intermediate second and third stages showing respective diode conduction. As discussed above, MOSFET turn on may occur when the current is flowing in its parallel diode after a dwell time. Operating in this manner ensures correct timing of the proposed transitions into active/synchronous rectification and/or crowbar operation as more time is available for the controller and gate drivers to respond.

The power conversion circuitry 500 is configured for sequenced soft switching from its initial state (i.e. passive rectification) into active/synchronous rectification and/or crowbar operation in the case of a total collapse of the DC side voltage to zero. For some fault conditions where crowbar operation is used to enable DC side isolation with zero current, the DC side voltage may be helpful. Under these conditions, operation in either passive or active/synchronous rectification modes (e.g. first or second modes of operation discussed above) may be extended to enable the fault current to be reduced before the power converter circuitry 500 is soft switched into its crowbar control mode. Operation in either rectifier mode may allow any DC side voltage to be passed to the AC terminals 504A, 504B, 504C of the power conversion circuitry 500, which acts in a positive manner to drive the current to a lower value than would be achieved by immediately transitioning to another mode of operation.

It will be understood that the disclosure is not limited to the examples above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. Power conversion circuitry configured to transition between modes of operation during an electrical fault, the power conversion circuitry comprising:
   switching circuitry configured to control currents flowing along a plurality of current paths between respective pairs of nodes of the power conversion circuitry, wherein the plurality of current paths each comprise first and second transistor-diode pairs connected along the respective current path; and
   control circuitry connected to the switching circuitry, the control circuitry configured to:
      configure the switching circuitry to transition, when the electrical fault is detected, to a first mode of operation by configuring transistors of the transistor-diode pairs to switch to a non-conducting state such that currents flow along the respective current paths through diodes of the transistor-diode pairs during the first mode of operation,
      determine, for each current path, when current begins to flow through a given diode of a given transistor-diode pair during the first mode of operation, and
      configure the switching circuitry to transition from the first mode of operation to a fault mode of operation by configuring transistors of the given transistor-diode pairs to sequentially switch to a conducting state when current begins to flow through the given diodes such that currents flow along the respective current paths through the configured transistors during the fault mode of operation.

2. The power conversion circuitry according to claim 1, wherein the control circuitry is configured to:
   configure the switching circuitry to transition from the first mode of operation to the fault mode of operation by configuring transistors of the given transistor-diode pairs to sequentially switch to the conducting state when current begins to flow through the given diodes in a switching order.

3. The power conversion circuitry according to claim 2, wherein the given diodes are diodes corresponding to either the first transistor-diode pairs or the second transistor-diode pairs,
   the switching order is a sequential order in which current is determined to begin to flow through the given diodes, and
   transistors of the given transistor-diode pairs are configured to remain in the conductive state during the fault mode of operation.

4. The power conversion circuitry according to claim 2, wherein the given diodes are diodes corresponding to both the first transistor-diode pairs and the second transistor-diode pairs, and
   the switching order is a sequential order by which the transistors of the given transistors-diode pairs are switched between the conductive state and the non-conductive state.

5. The power conversion circuitry according to claim 4, wherein:
   the fault mode of operation is a second mode of operation, and
   the power conversion circuitry is configured to transition from the second mode of operation to a third mode of operation by configuring the control circuitry to:
   identify given diodes as diodes corresponding to either the first transistor-diode pairs or the second transistor-diode pairs,
   determine, for each current path, when current begins to flow through the given diodes during the second mode of operation,
   identify an updated switching order as a sequential order in which current is determined to begin to flow through the given diodes, and
   configure the switching circuitry to transition from the second mode of operation to the third mode of operation by configuring transistors of the given transistor-diode pairs to sequentially switch to the conducting state when current begins to flow through the given diodes in the updated switching order, and wherein:
   transistors of the given transistor-diode pairs are configured to remain in the conductive state during the third mode of operation.

6. The power conversion circuitry according to claim 4, wherein the switching circuitry is configured to remain in the fault mode of operation for a predetermined fault mode period.

7. The power conversion circuitry according to claim 1, wherein the switching circuitry is configured to remain in the first mode of operation for a predetermined first mode period.

8. The power conversion circuitry according to claim 1, wherein:
the power conversion circuitry comprises current sensors coupled to each current path, the current sensors configured to detect a direction in which current is flowing along the respective current path, and
the control circuitry is configured to determine when current begins to flow through the given diodes based on the direction of current detected by the respective current sensor.

9. The power conversion circuitry according to claim 8, wherein:
the control circuitry determines diode conduction periods of the given diodes based on the direction of current detected by the respective current sensor, and
the switching circuitry configures transistors of the given transistor-diode pairs to sequentially switch to the conducting state either:
at a start of the corresponding diode conduction period, or
after a predetermined dwell time after the start of the corresponding diode conduction period.

10. The power conversion circuitry according to claim 3, wherein the plurality of current paths each comprise:
the first transistor-diode pair comprising a first transistor and a first diode connected in anti-parallel with each other along a first circuit branch between a first node and a second node, and
the second transistor-diode pair comprising a second transistor and a second diode connected in anti-parallel with each other along a second circuit branch between the first node and the second node, the second nodes of the respective circuit branches being connected together, wherein the control circuitry is configured to:
determine given diodes as either the first diodes of the first transistor-diode pairs or the second diodes of the second transistor-diode pairs,
determine, for each current path, when current begins to flow through the given diodes during the first mode of operation, and
configure transistors of the given transistor-diode pairs to sequentially switch to the conducting state when current begins to flow through the given diodes in the switching order such that currents only flow between branches of the current paths corresponding to the configured transistors during the fault mode of operation.

11. The power conversion circuitry according to claim 5, wherein the plurality of current paths each comprise:
the first transistor-diode pair comprising a first transistor and a first diode connected in anti-parallel with each other along a first circuit branch between a first node and a second node, and
the second transistor-diode pair comprising a second transistor and a second diode connected in anti-parallel with each other along a second circuit branch between the first node and the second node, the second nodes of the respective circuit branches being connected together, wherein the control circuitry is configured to:
determine given diodes as either the first diodes of the first transistor-diode pairs or the second diodes of the second transistor-diode pairs,
determine, for each current path, when current begins to flow through the given diodes during the second mode of operation, and
configure transistors of the given transistor-diode pairs to sequentially switch to the conducting state when current begins to flow through the given diodes in the switching order such that currents only flow between branches of the current paths corresponding to the configured transistors during the third mode of operation.

12. The power conversion circuitry according to claim 1, wherein the plurality of current paths each comprise:
the first transistor-diode pair comprising a first transistor and a first diode connected in anti-parallel with each other along a first circuit branch between a first node and a second node, and
the second transistor-diode pair comprising a second transistor and a second diode connected in anti-parallel with each other along a second circuit branch between the first node and the second node, the second nodes of the respective circuit branches being connected together.

13. The power conversion circuitry according to claim 1, wherein the plurality of current paths comprises first, second and third current path.

14. The power conversion circuitry according to claim 1, wherein the switching circuitry is configured to transition, when the electrical fault is detected in the power converter circuitry, from a converter mode of operation, in which the currents are converted from alternating currents, AC, to direct currents, DCs, to the first mode of operation.

15. The power conversion circuitry according to claim 1, wherein the transistors of the transistor-diode pairs are bi-directional transistors.

16. The power conversion circuitry according to claim 1, where the power conversion circuitry is a three-phase bridge circuit.

17. The power conversion circuitry according to claim 1, wherein the power conversion circuitry is a bidirectional AC to DC converter.

18. A method of controlling power conversion circuitry to transition between modes of operation during an electrical fault, the power conversion circuitry comprising switching circuitry configured to control currents flowing along a plurality of current paths between respective pairs of nodes of the power conversion circuitry, wherein the plurality of current paths each comprise first and second transistor-diode pairs connected along the respective current path, the method comprising:
configuring the switching circuitry to transition, when the electrical fault is detected, to a first mode of operation by switching transistors of the transistor-diode pairs to a non-conducting state such that currents flow along the respective current paths through diodes of the transistor-diode pairs during the first mode of operation,
determining, for each current path, when current begins to flow through a given diode of a given transistor-diode pair during the first mode of operation, and
configuring the switching circuitry to transition from the first mode of operation to a fault mode of operation by sequentially switching transistors of the given transistor-diode pairs to a conducting state when current begins to flow through the given diodes such that currents flow along the respective current paths through the configured transistors during the fault mode of operation.

19. A non-transitory computer-readable medium comprising instructions which, when executed on a computer of power conversion circuitry, cause the computer to perform the method of claim 18.

\* \* \* \* \*